Feb. 8, 1944.　　　L. R. WILLIAMSON　　　2,341,494
SHEAR
Filed Aug. 28, 1941　　5 Sheets-Sheet 1
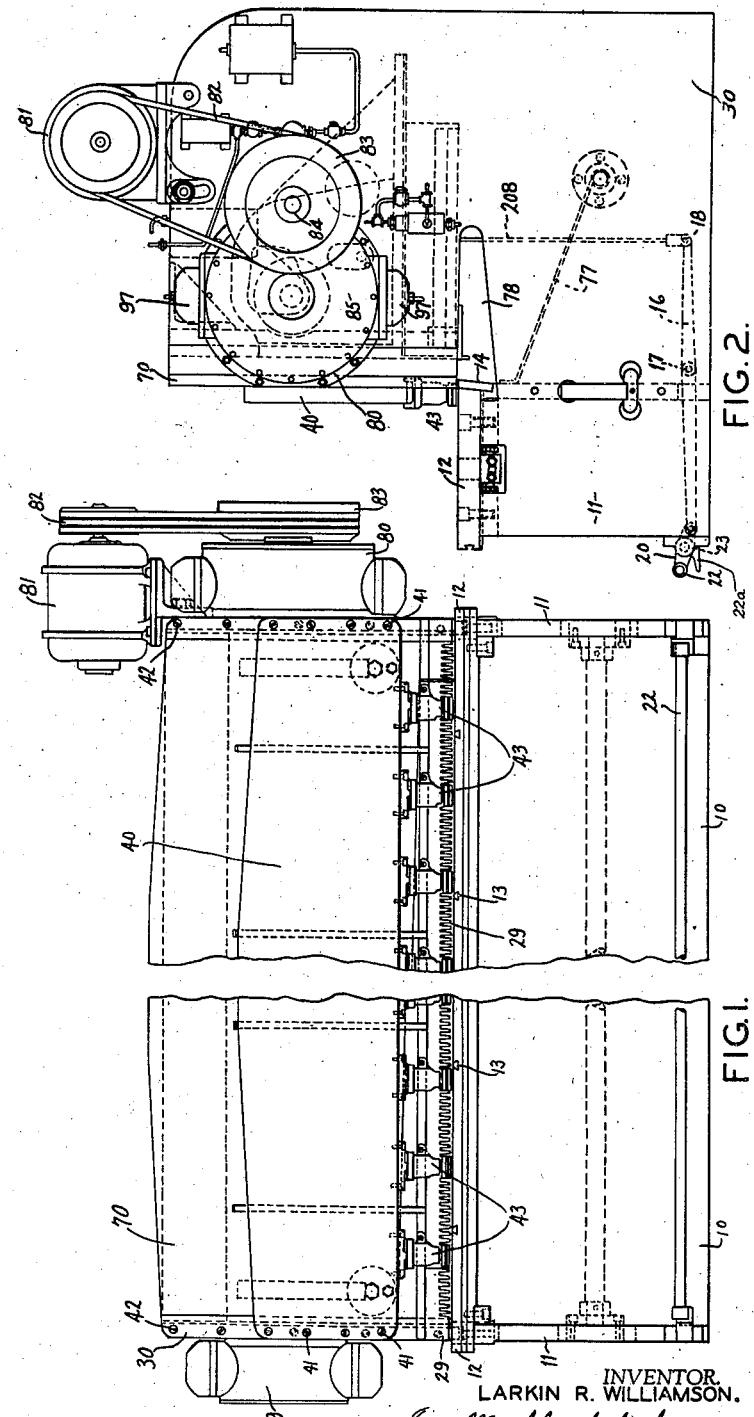
INVENTOR.
LARKIN R. WILLIAMSON.
BY
ATTORNEYS.

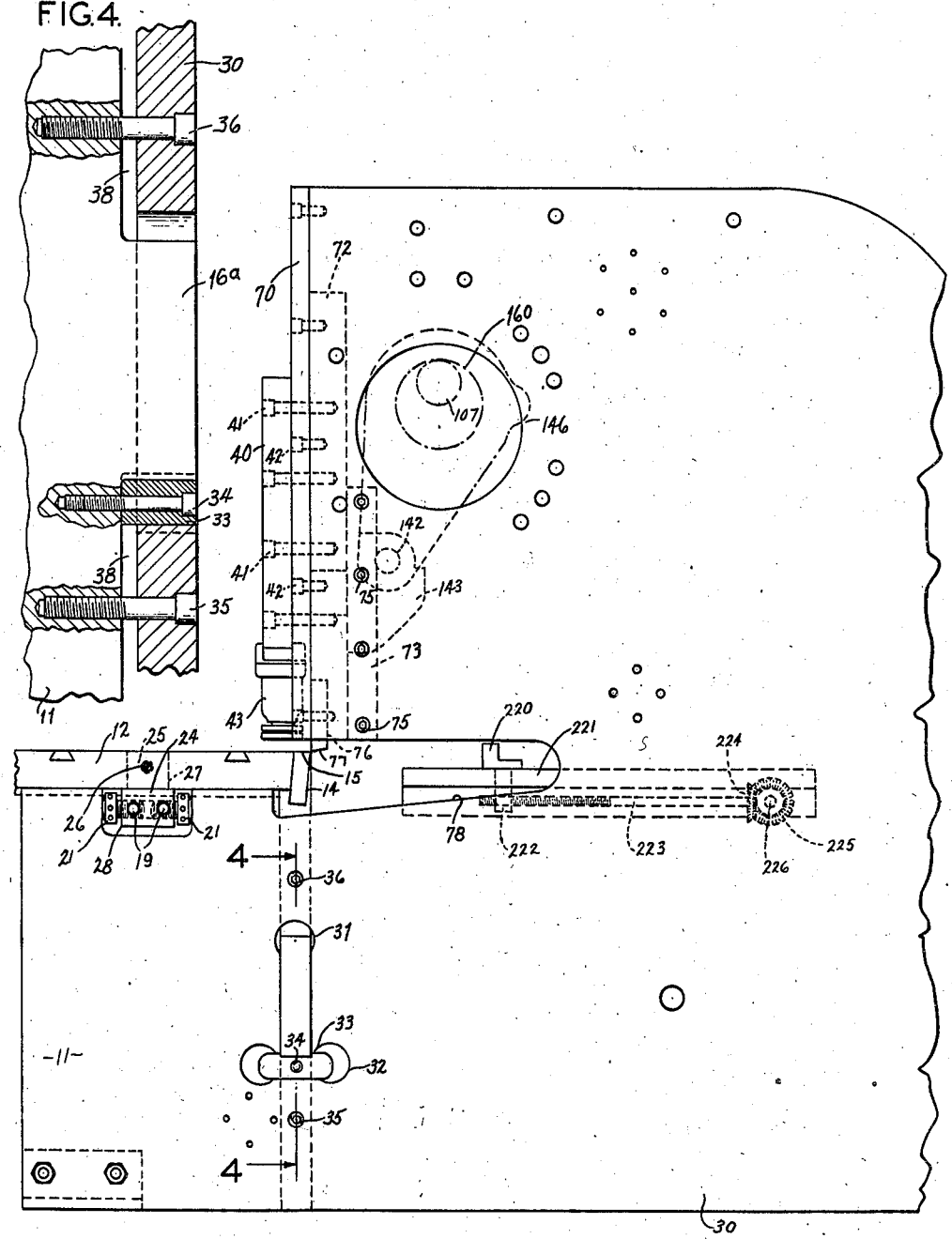

Feb. 8, 1944.                L. R. WILLIAMSON                2,341,494
                                  SHEAR
                         Filed Aug. 28, 1941            5 Sheets-Sheet 3
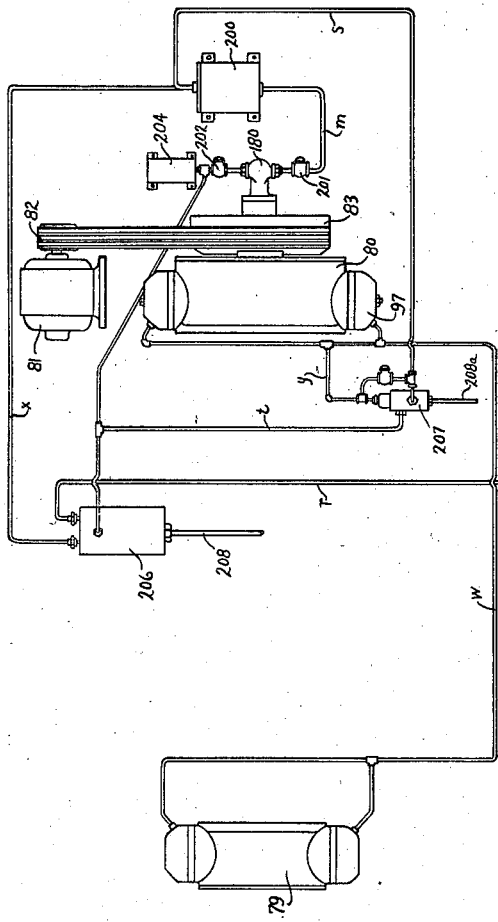
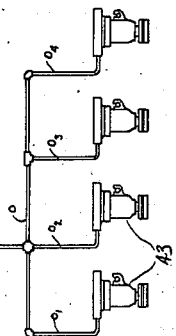
FIG.11.
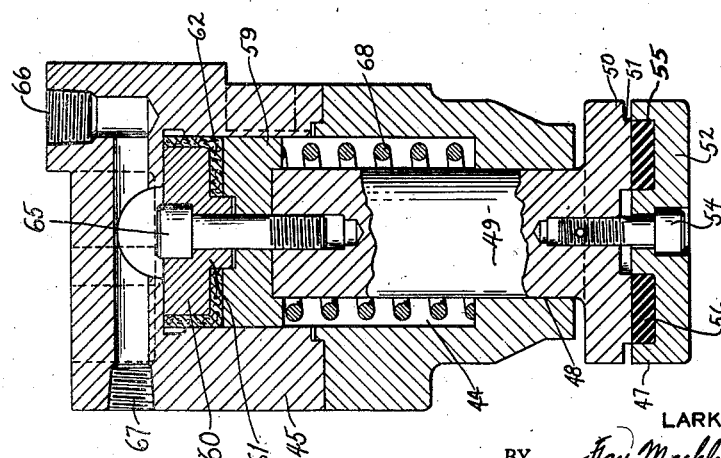
FIG.5.
INVENTOR.
LARKIN R. WILLIAMSON
BY
ATTORNEYS.

Feb. 8, 1944.   L. R. WILLIAMSON   2,341,494
SHEAR
Filed Aug. 28, 1941   5 Sheets-Sheet 5

INVENTOR.
LARKIN R. WILLIAMSON
BY Fay, Macklin, Gohrick,
Williams, Chilton and Isler.
ATTORNEYS Patented Feb. 8, 1944

2,341,494

UNITED STATES PATENT OFFICE 2,341,494

SHEAR

Larkin R. Williamson, Brooklyn, N. Y., assignor to E. W. Bliss Company, Brooklyn, N. Y., a corporation of Delaware Application August 28, 1941, Serial No. 408,652

5 Claims. (Cl. 164—110)

The present invention relates to shears for cuting metal pieces of the type, in which a lower knife is mounted on a bed plate and a movable upper knife is mounted on a reciprocating ram. One of the objects of my invention is to provide for a novel ram actuating mechanism in which a clutch and a brake, both controlled by hydraulic pressure, operate and stop the action of a planetary gear which is used for transmission of power to the ram operating eccentric.

Another object of my invention relates to hydraulic hold-down members which form a part in the general combination of my novel metal shears. Further objects will appear hereinafter from the following description taken in connection with the accompanying drawings.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:

Fig. 1 is a front elevation of the machine;

Fig. 2 is a side elevation of the same;

Fig. 3 is an enlarged view of some of the parts shown in Fig. 2 with the transmission case removed.

Fig. 4 is a section on line 4—4 of Fig. 3;

Fig. 5 shows a single hold-down member in section;

Fig. 8 is a section on lines 8—8 of Fig. 7;

Fig. 10 is a view of the brake partly in section; and

Fig. 11 is a diagrammatic view of the hydraulic power and control system.

Figure 6:
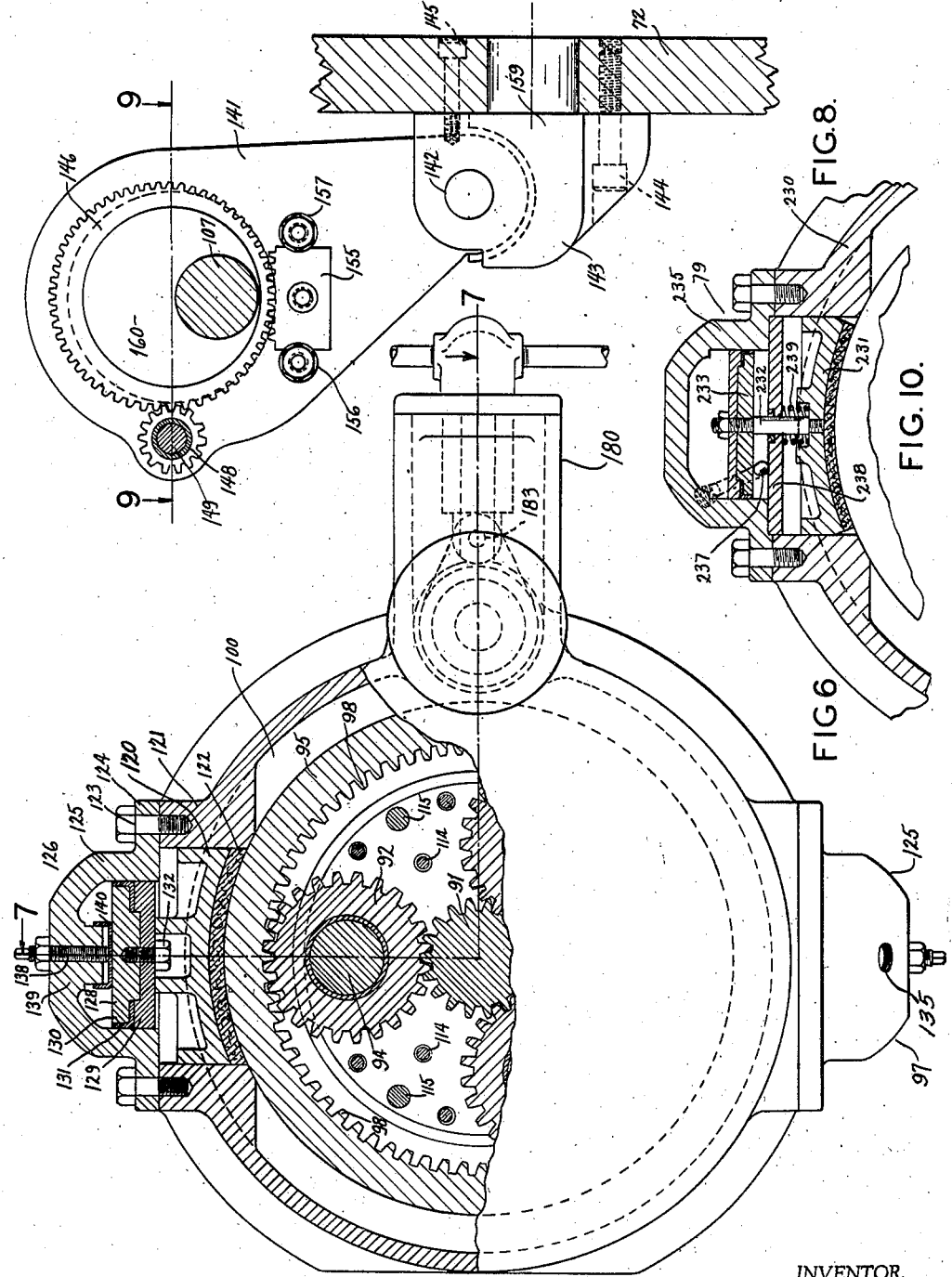
Fig. 6 is a view partly in section of the transmission and the pump for supplying of liquid under pressure to the hydraulic system.

Referring to Figs. 1, 2 and 3, the machine comprises a frame 10 connected at both ends to rolled steel side plates 11 which serve as a support for a bed plate 12 onto which the metal strip is delivered and upon which it rests while being cut. Plates 11 will hereafter be called the bed supports. Stops 13 are provided at intervals on said bed plate, thus allowing pieces of predetermined length to be cut.

Bed plate 12 carries at the rear, extending over the entire length thereof, a blade 14 rigidly fixed to said plate and slidable therewith in a horizontal plane (from right to left in Fig. 2). The upper edge 15 of this blade is not completely horizontal, but is set at a slight downward angle with the vertical edges. The purpose of this arrangement will be explained below.

The bed plate is mounted in the bed supports 11 so as to be horizontally adjustable in order to bring blade 14 into proper position for cooperation with the upper blade 76 which is carried by a ram 72 and will be more fully described later. The means for adjusting the bed plate, best seen in Fig. 3, consists in a block 24 having an upper portion 25 closely fitted into a socket 27 of the bed plate and held by a screw 26, and a lower portion 28 mounted between two adjusting knobs 21 having fine threads which will allow of very accurate adjustment of blade edge 15. Two lock screws 19 are provided for holding the parts in place after adjustment has been made.

The side frame of the machine is formed by two heavy rolled steel plates 30, one at each side of the machine, special means being provided for fastening the bed supports to said plates in view of the high stresses in this part of the machine which arise from the ram pressures. These fastening means are shown in Fig. 4.

As shown in that figure, the bed plate 11 is formed with an extension 16a projecting into a cut-out portion of side plate 30. A connecting member 33 made of specially hardened wear resisting material is passed through holes 32 provided therefor. It is bolted to bed support 11 by means of a bolt 34. Two heavy bolts 35 and 36 are used for fastening plate 30 and bed support 11 over air gaps 38 which are provided so as to allow for a certain amount of play in the connection under heavy thrusts of the ram, since a rigid construction might lead to cracks in the metal. For the same reason, that is, to prevent the beginning of fracture cracks under heavy stresses, the holes 32 are formed with curved rather than sharp angular cross-section.

The upper part of the machine comprises a hold-down plate 40 secured to the side plates 30 by bolts 41. The hold-down plate carries a series of hold-down members 43 serving the well-known purposes of clamping work down on the bed plate while it is being operated upon. The construction of these hold-down members is shown in Fig. 5.

Each of these hold-down members comprises a cylinder made up of two parts 44 and 45. A piston 47, also consisting of two parts, is fitted with its rod portion 49 into the cylinder at 48.

The piston head is widened to form a plate 50 with a ring-shaped ridge 51 thereon. Attached to said piston head by means of a bolt 54 is a bottom plate 52 equal in diameter to the piston head and having a wide annular groove 55 formed therein corresponding in contour to the ridge 51. Said groove 55 houses a packing ring 56 of neoprene or similar oil resistant material. This construction of the piston is intended to make the engagement of the hold-down with the work yieldable to an extent that will compensate unevenness in the surface of said work.

The top of piston 47 which is fitted into the upper portion 45 of the cylinder, is formed by a piece 59 having a central recess which engages with a correspondingly shaped extension 61 of a cap 60, a packing or diaphragm 62 being thus held down on the top 59 of the piston and laterally between cylinder 45 and cap 60. The cap itself is rigidly secured to piston rod 49 by a strong bolt 65. Ports 66 and 67 are provided for admitting and withdrawing oil under pressure which actuates the piston 47. One of the ports is normally closed and only opened to eliminate entrapped air. A spring 68 mounted in the cylinder normally keeps the piston in retracted position. All the hold-down members 43 are connected to a common supply pipe as will more fully appear in the description of the hydraulic system in connection with Fig. 11.

Directly behind the hold-down plate 40 a gib 70, called the front gib, is mounted which forms part of the guide for the ram 72. A series of bolts 41 rigidly connect the hold-down plate, gib 70 and side plates 30, while another series of shorter screws 42 serve for fastening together the gib 70 and the side plate 30. At the rear of the ram 72 a gib 73, the back gib, is mounted, fastened to plate 30 by means of bolts 75; this back gib completes the guideway for the ram. In front of the ram a guard or shield 29 (Fig. 1) is mounted for protecting the operator against the cutting action of the movable knife. Since guards of similar construction are generally used in the art, the same is not described in detail.

Rigidly secured to the ram 72 at the bottom edge thereof is the movable knife blade 76. The lower blade edge 77 of this knife is inclined at a slight upward angle to a plane normal to the face of the bed. Thus, when the two blades 14 and 76 meet their cutting edges 15 and 77 will not be in line, but they will include an angle as shown in Fig. 3, thus avoiding a scraping action on the metal and providing clearance for the parts. It will be understood that the ram and the movable knife, as illustrated in Fig. 3, are in down position. A large opening 78 in side wall 30 allows the metal sheet to be inserted to its proper position even though wider than the distance between frame members 30.

In order to properly adjust the sheet introduced for shearing so that it will register with the knife, a back gauge 220 of known construction is provided, which is mounted on rails 221 that are fastened to the side plate 30. The adjustment of said back gauge is accomplished by a nut 222 at each end of the gauge which is in engagement with a respective threaded bar 223. These latter each carry at the end a bevelled gear 224 which mesh with gears 225 mounted on a shaft 226. This shaft may be rotated by a ratchet (not shown) to adjust the gauge back and forth.

The part of the sheet severed by the knife may be removed at the rear of the machine.

On that side of the machine where the motor is located a gear case 80 is mounted for housing the various parts of the ram driving transmission. On the opposite side a brake mechanism, generally designated by 79 is secured to the machine frame. The clutch mechanism as well as the brake mechanism are operated by hydraulic pressure, the former being engaged by application of pressure and the latter being released by the application of pressure. Both mechanisms are coupled to the same main shaft (107 in Fig. 7).

The ram is driven by a motor 81, which acts through belting 82 to drive a flywheel pulley 83. The pulley is journalled on a shaft 84 through which power is transmitted from the motor to the driven parts of the machine by means of the drive mechanism shown in Figs. 6 to 9.

Figures 7, 9:
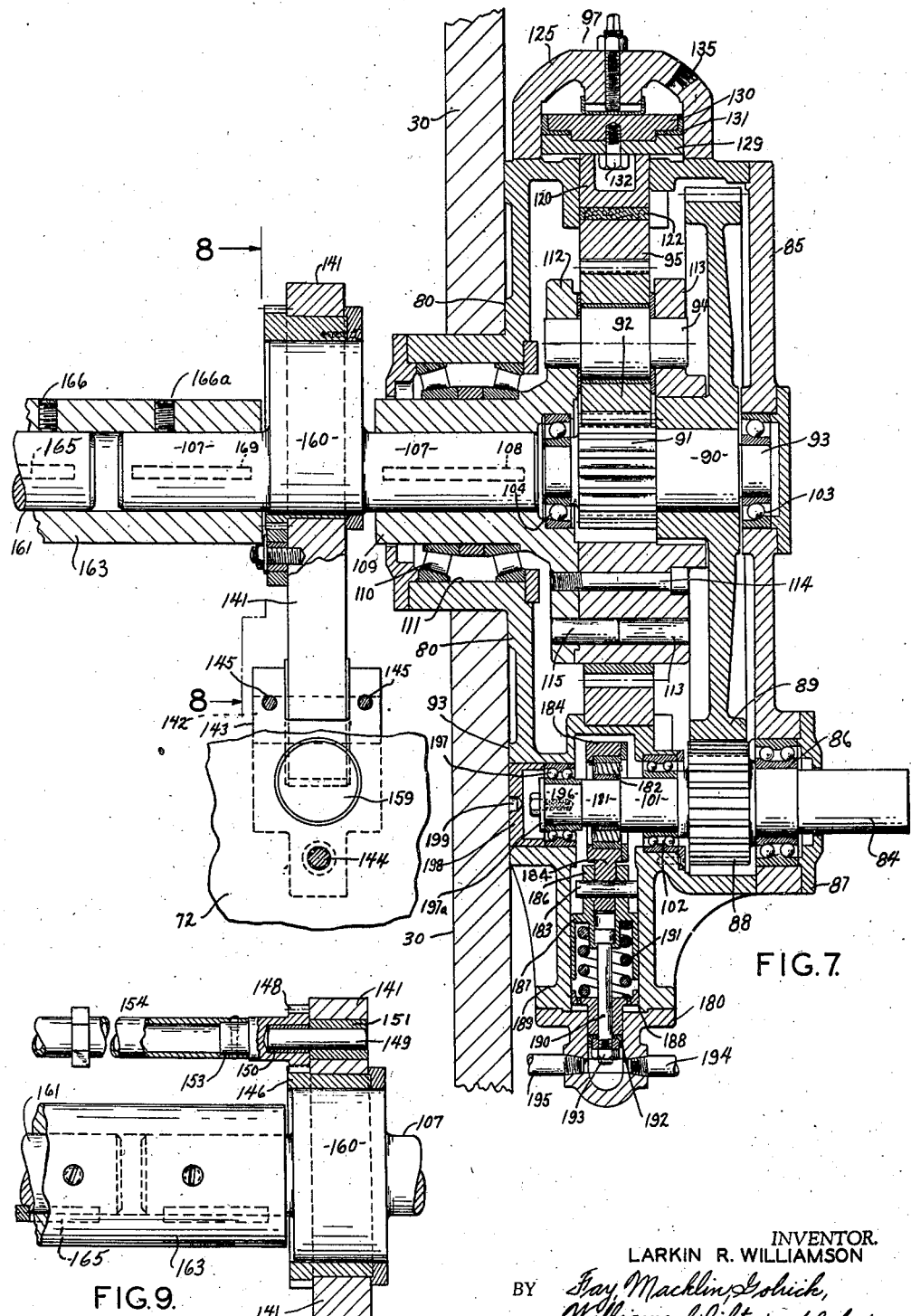
Fig. 7 is a section on lines 7—7 of Fig. 6.
Fig. 9 is a section on lines 9—9 of Fig. 8.

In Fig. 7 the gear case or housing 80 is shown suitably secured to the machine frame 30. The housing is rigidly secured to the frame to eliminate as far as possible any driving strain in the parts with a resultant effect on the life of the machine and its operation. The housing is open at the face remote from the side plate 30 and is provided with a closely fitted removable cap 85 to seal this opening and support some parts of the mechanism while readily permitting access to the housing. Into the lower portion of the cap 85 is fitted a ball bearing 86 in which is journalled the drive shaft 84.

The shaft 84 has keyed thereto a pinion 88 which is positioned between the bearings 86 and another bearing 102 in which a reduced part of shaft 84 is journalled. This pinion is in mesh with and drives a large gear 89 which is keyed to a short stub shaft 90 mounted in ball bearings 103 and 104. The former set of bearings are carried in the cap 85 while the latter set are mounted in a portion of the driven mechanism as hereinafter described. The hub and toothed portion of the gear 89 are connected by off-set spokes which provide space for partially mounting over the gear hub hereinafter to be described. A pinion 91 which lies closely against the inner portion of the opening of the gear 89 is likewise keyed to the shaft 90.

The driven shaft of the mechanism which connects with the operative portion of the machine tool is represented at 107. Closely overlying the end of the shaft is a flanged bushing 109. The outer portion of the bushing is concentric with the shaft and carries the inner races of a pair of tapered thrust bearings 110. The outer races are received within an enlarged opening 111 formed in an inwardly extending sleeve portion of the gear case. The outer periphery of this sleeve portion in turn closely fits the machine frame 30. To provide a concentric assembly consisting of the shaft 107, the bushing 109, the bearings 110, the case sleeve and the corresponding opening in the frame 30, the bushing 109 passes within the housing and flares outwardly to form a radial flange 112. A recess is provided concentric with the shaft 107 at the right-hand face of the flange and this recess carries the outer race of the ball bearing unit 104 heretofore described.

Three cluster gears 92 are carried by the flange and rotate therewith. Each gear is rotatably mounted on a pin 94, which is reduced in cross-section at each end and one end of which is carried in the aforesaid flange 112. The other end of each pin is carried in a reinforcing plate 113 in such manner that the three gears are spaced 120° apart and are each in mesh with the pinion 91. The plate and flange are bolted together by three bolts 114 and additionally three dowels 115 are provided to reinforce the bolts in securing the plate and flange together as an integral unit.

A large internal gear 95 is rotatably mounted on the housing in a raceway formed at 100 (Fig. 6). This gear is provided on its inner annular face with teeth 98 which engage each of the pinions 92 and result in the gear 95 being normally slowly rotated by reason of the drive from the pinion 91 which rotates the pinions 92. The mounting of the parts is such that the gear 95 rotates more easily than does the shaft 107 connected with the working parts of the machine. Accordingly, when the machine tool is not being driven, the gear 95, the cluster gear 92 and the pinion 91 are all in rotation while the shaft 107 remains idle. However when the gear 95 is clamped against rotation, the driving force of the pinion 91 rotates the cluster gear thereabout resulting in a drive to the machine parts through the shaft 107.

To drive the ram, a pair of opposed brake shoes 120 are, therefore, urged into clamping relation with the outer annular face of the gear 95. These shoes are slidable in ways 121 in the housing and are each provided on its gear engaging face with suitable friction material 122. The ways 121 extend through the housing which is open at their outer ends to allow insertion of the shoes. Such openings are normally closed by a removable cap 125 having annular flanges 124 overlying the ends of the slideways and bolted thereto by bolts 123. In cap 125 a cylinder is formed, in which a piston 128 comprising parts 129 and 130 is slidably mounted. This piston is provided with a packing 131. Fluid under pressure is admitted through an opening 135 to each of the two cylinders and upon its admission each piston forces a respective shoe with clamping relation with the internal gear 95 to lock the same against rotation.

To limit the outward movement of the parts when the mechanism stands idle, a bolt 138 is provided and mounted in a central boss 139 of the cap 125. At its inner end the bolt engages a clip 140 which may be adjusted inwardly or outwardly to control the amount of return in respective pistons 128 when the pressure is released and the drive is disconnected.

The brake mechanism 79 which is arranged at the other side of the machine frame is illustrated in Fig. 10. The brake has a frame 230 in which a shoe 231 is slidably supported and rigidly connected to a rod 232 of a piston 233. 235 indicates the walls of a cylinder in which the piston 233 is slidably mounted. An opening for admission of oil is designated by 237. Between the shoe 231 and the bottom 238 of the cylinder a spring 239 is mounted which forces the shoe into engagement with the driven members. Upon admission of oil through opening 237 pressure is exerted on piston 233 which counteracts the action of spring 239 and disengages the brake from the rotating members. Thus while the machine is working and the pump operating and circulating oil under pressure through the system, the brake will be inactive. It will only stop the machine after the pump action is temporarily interrupted or definitely terminated.

The pump which builds up the pressure for operating the driving mechanism is shown in Figs. 6 and 7 and designated by 180 in a general way. The pump is operated from a stub 101 of the main drive shaft, said stub carrying an eccentric 181 journalled in a bearing 182. The eccentric carries an eccentric strap 184, connected by a pin 183 to yoke portions 186 of a two-part plunger 187, 188 reciprocating within cylinder walls 189 formed on the casing 80.

The parts 187 and 188 of the plunger are held together by a nut 190 which is rigidly secured to the lower part 188 and slidably mounted within the upper part 187. A calibrated spring 191 forces the two pieces apart and makes them move as a unit, until a certain pressure, strong enough to overcome the spring, is reached. A leather cup 192 or other packing device is secured to the bottom of plunger 188 by a bolt 193 to prevent leakage of oil inwardly between the plunger and the cylinder walls. A pipe 194 connects the pump with the oil tank 200 from which oil is withdrawn and delivered through a pipe 195 to the accumulator 204 (both tank and accumulator being diagrammatically shown in Fig. 11).

The action of the pump proceeds until a certain desired pressure is reached. Thereafter the over pressure in the liquid puts the spring out of action thus preventing any further pumping action of the plunger with resultant increase of pressure in the accumulator. When the pressure drops below the amount necessary for the operation of the machine, spring 191 will once more become operative and the pump action will be resumed.

The drive shaft 84 has an end step 196 mounted in ball bearings 197 which are fitted in a sleeve portion 93 of casing 80 and held by a plate 197a bolted to the shaft. A removable cap 198 lying closely against frame 30 is held in place by a stud 199 and seals the opening of the sleeve 93.

For adjusting the stroke of the ram an eccentric mechanism may be used, which is best seen in the left-hand part of Fig. 7, and in Figs. 8 and 9. An eccentric 160 is formed on shaft 107 and has an eccentric strap 141 mounted thereon, the lower end of which is connected by a pin 142 carried by a yoke 143. The latter is rigidly connected to the ram 72 by means of heavy bolts 144 and 145 and has furthermore a projecting portion 159 fitting closely into a machined hole in the ram.

Among the desired features in the eccentric mechanism is the adjustment device for making the stroke of the eccentric strap and thereby the stroke of the ram itself correspond to a desired depth of cut. To this end I have provided a bushing 146 on the eccentric strap 141, said bushing having a gear formed externally and being itself eccentric. A pinion 148 journalled on a shaft 149 engages with the gear on bushing 146 and serves for adjusting the bushing in a desired position that defines the stroke of the ram. The adjustment of shaft 149 may be made by hand. Fig. 9 shows in greater detail the manner in which the adjustment mechanism is mounted. Shaft 149 carries a bushing 150, on which pinion 148 is mounted, and a second bushing 151 for the support of the eccentric strap 141. Pinion 148 has a reduced neck portion 153 over which a pipe 154 is fitted which connects this part of the adjusting mechanism through the width of the machine to a duplicate mechanism on the other side.

By a similar arrangement the main shaft 107 on the left side of the eccentric 160 is connected by means of a central shaft 161 extending through the machine to the other side where the duplicate eccentric mechanism is located. The connection is made by means of a coupling 163 keyed to shaft 107 at 169 and to the continuing central shaft 161 at 165, thus securing these shafts against displacement by rotation while the set screws 166, 166a prevent the coupling from sliding.

A locking device is also provided to fix the bushing 146 in the desired position. This locking device consists in a rack 155, which meshes with the gear on bushing 146 while this is set by the action of pinion 148. After the intended position is reached nuts 156 and 157 are tightened and lock the device and thereby the bushing 146 against further movement.

Referring now to Fig. 11 the hydraulic control system comprises the pump 180 which is driven from motor 81 over pulley 83, by shaft 84 and the transmission described above in connection with Fig. 6. The pump is connected by a pipe $m$ with the oil tank 200 from which each suction stroke withdraws oil, through a check valve 201 opening in the upward direction only. The oil is delivered through a similar check valve 202 to two valves 206 and 207 and to an accumulator 204 where pressure is built up. When it is intended to start the hydraulic cycle an operating valve 206 is actuated by a rod 208 from a foot treadle 22 (Fig. 1). Oil is then flowing through valve 206 and pipe $r$ to a line $o$ which connects up to the hold-down member 43 by branch lines $o_1$ to $o_4$, causing said members to clamp the work.

By pushing the foot treadle on to the second position a member 22a is engaged which serves to actuate valve 207. This valve operates the brake shoe mechanism 97 over line $y$, which mechanism controls the coupling of the clutch to establish the ram drive. At the same time oil under pressure is admitted through line $w$ to the brake mechanism 79 which is released thereby. The machine is then ready to perform the shearing operation. After this is done the treadle is allowed to return to its initial position, reversing the action of valves 206 and 207. When valve 206 is reversed, the hold-down members are released at the same time and oil is returned through pipe $x$ to the tank 200, which is under atmospheric pressure, while, owing to the reversal of valve 207, pipe $t$ is shut off and the connection of pipes $y$ and $w$ to the tank opened over line $s$. The brake mechanism 79 is applied thereby and the rotation of the drive mechanism for the ram is completely stopped.

As already mentioned, a foot treadle is provided for starting the operation of the machine. It comprises a plurality of bars and pivotally mounted levers which transmit the motion of the treadle over two actuating positions to the valves 206 and 207 in the hydraulic power system just described.

The starting treadle mechanism shown in Fig. 2 comprises a bar 22 extending through the machine frame from one side plate to the other. It is mounted on a lever 20 which is pivoted on a pin 23. This pin has one end pivotally connected to a lever 16 mounted for rocking movement on a shaft 17; the other end of lever 16 is pivoted on a pin 18, to which is also pivoted a rod 208 which connects the operating valve 206 to the starting mechanism. A duplicate mechanism of the one just described is connected to a member 22a and arranged substantially in parallel to the first mentioned mechanism; it serves for operating valve 207.

In operation the work is presented on the table below the upper shear. The knives are adjusted in accordance with the thickness of the material to be cut and so is the eccentricity of the bushing. The operator then starts the hydraulic system in operation by pressing down the treadle bar 22, to rock the lever 16 and moves the rod 208 downwardly actuating the operating valve 206. The actuation of valve 206 initiates the hydraulic cycle by first admitting oil under pressure to the hold-down members which will clamp the work before the movable knife bears on the same. After the work is properly clamped by the holddowns, the workman exerts more pressure on the pedal 22 until the second member 22a becomes engaged, which then operates valve 207 in the manner described above in connection with valve 206. The machine then works as described above with reference to Fig. 11.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a shear comprising a reciprocating ram, cutting means on said ram, a hold-down plate, a series of hold-down members mounted on said plate, a clutch for alternately coupling and releasing a ram operating gearing, a brake for completely stopping the machine, and driving means to operate said shears, in combination a hydraulic system comprising a pump, a tank connected to one side of said pump for supply of liquid, an accumulator connected to the other side of said pump for receiving liquid under pressure, means connected to said accumulator and actuated by the liquid under pressure therefrom for coupling and releasing respectively said hold-down system and said clutch, and means for applying the brake simultaneously with the release of the clutch.

2. In a shear comprising a reciprocating ram, cutting means on said ram, a hold-down plate, a series of hold-down members mounted on said plate, a clutch for alternately coupling and releasing a ram operating gearing, a brake for completely stopping the machine and driving means to operate said shears, in combination a hydraulic system comprising a pump, a tank connected to one side of said pump for supply of liquid, an accumulator connected to the other side of said pump for receiving liquid under pressure, a reversible valve for operating said hold-down system and a second reversible valve for operating said clutch and said brake, said second valve being adapted to cause the release of the brake when the clutch is applied and the application of the brake when the clutch is released.

3. In a shear comprising a reciprocating ram, cutting means on said ram, a hold-down plate, a series of hold-down members mounted on said plate, a clutch for alternately coupling and releasing a ram operating gearing, driving means to operate said shears and a brake for stopping the action of the driving means in combination, a hydraulic system comprising a pump, a tank connected to one side of said pump for supply of liquid, an accumulator connected to the other side of said pump for receiving liquid under pressure, a reversible valve actuated by the liquid under pressure for coupling and releasing respectively said hold-down system and a second reversible valve for coupling said clutch while releasing said brake and for releasing said clutch while applying said brake and a single member for first actuating said first mentioned valve and thereafter actuating said second valve and for reversing said valves in opposite order.

4. In a shear comprising a reciprocating ram, cutting means on said ram, a hold-down plate, a series of hold-down members mounted on said plate, driving means to operate said shears in combination a clutch for alternately coupling and releasing a ram operating gearing mounted at the same side of the shears with said driving means, a pump for building up pressure to operate said clutch and said hold-down mechanism mounted in proximity to said clutch and a brake for completely stopping the driven parts of said shears mounted on the other side of the machine frame.

5. In a shear comprising a reciprocating ram, cutting means on said ram, a hold-down plate, a series of hold-down members mounted on said plate, driving means to operate said shears in combination a clutch for alternately coupling and releasing a ram operating gearing mounted at the same side of the shears with said driving means, a pump for building up pressure to operate said clutch and said hold-down mechanism mounted in proximity to said clutch and a brake for completely stopping the driven parts of said shears mounted on the other side of the machine frame, said brake becoming active when said clutch is disconnected and inactive when said clutch is connected to said driving means.

LARKIN R. WILLIAMSON.